United States Patent [19]

Peter

[11] 4,070,051

[45] Jan. 24, 1978

[54] BUMPER FOR MOTOR VEHICLE

[75] Inventor: Dietmar Peter, Stuttgart-Feuerbach, Germany

[73] Assignee: Porsche AG, Germany

[21] Appl. No.: 726,559

[22] Filed: Sept. 27, 1976

[30] Foreign Application Priority Data

Sept. 26, 1975 Germany .............................. 2542920

[51] Int. Cl.² ............................................. B60Q 1/04
[52] U.S. Cl. ..................................... 293/69 R; 362/82
[58] Field of Search ................... 293/63, 74, 60, 69 R, 293/71 R; 240/8.1 R, 8.1 A, 7.1 G, 7.1 H, 7.1 LJ

[56] References Cited

U.S. PATENT DOCUMENTS 3,869,165   3/1975   Miller ..................................... 293/63

FOREIGN PATENT DOCUMENTS 1,314,035   4/1973   United Kingdom ............ 240/7.1 LJ Primary Examiner—Barry L. Kelmachter
Attorney, Agent, or Firm—Craig & Antonelli

[57] ABSTRACT

An improved motor vehicle bumper comprises a form-stiff support, a headlight and an elastic covering forming the end portion of the vehicle body. The headlight is provided in a recessed portion and is held by a pair of holding members at wall portions of the elastic covering. Impact on the covering causes the headlight to be pivoted about its attachment to one of the wall members and prevent damage to the headlight proper.

4 Claims, 2 Drawing Figures

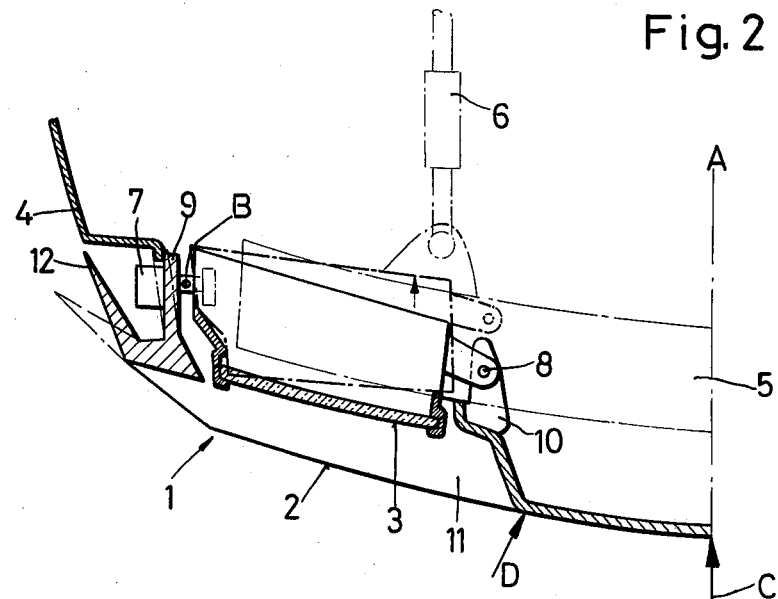

BUMPER FOR MOTOR VEHICLE

FIELD OF THE INVENTION

The present invention relates to a motor vehicle bumper which includes a form-stiff girder, a headlight, and an elastic covering forming the end region of the vehicle body.

BACKGROUND OF THE INVENTION

In conventional automobile bumpers, the headlight is affixed independently of the covering on a support arranged behind the covering. In the event of an impact on the bumper, particularly in the area of the headlight, the covering is instantly crushed and, without any movement of the headlight out of the way of the impact, the headlight itself becomes damaged.

SUMMARY OF THE INVENTION

It is an object of the present invention to obviate the disadvantages of conventional bumpers by providing an improved bumper wherein the headlight is provided at wall sections of the covering and is permitted to pivot about its connection to one of these wall portions upon an impact on the bumper so that damage to the headlight is avoided.

In particular, the headlight may have a basic rectangular shape so that it may be connected to one of the holding wall members in a hinge-like fashion, with a pivot connection being on the side of the headlight most remote from the center longitudinal plane of the vehicle. The holding members themselves are constructed in the form of screws and the wall portions are flange-like.

BRIEF DESCRIPTION OF THE DRAWINGS

FIG. 1 shows a front view of an automobile bumper in accordance with the present invention; and FIG. 2 shows another view of the automobile bumper according to the present invention taken along line II—II of FIG. 1.

DETAILED DESCRIPTION

Referring now to FIGS. 1 and 2 of the drawings, the bumper 1, proper, comprises a form-stiff yet elastic covering 2 in which a headlight is provided. The covering 2 is made of synthetic material, preferably foam material, and is formed at that portion of the vehicle body 4 wherein a form-stiff support 5 is provided, which is held in position on the body 4 by means of hydraulic dampers 6.

The headlight 3 is fastened at a recessed portion 11 of the covering 2 by way of a pair of wall portions 9 and 10 of the covering. These wall portions 9 and 10 are flange-shaped and support the headlight by way of a pair of holding elements 7 and 8. The holding element 7 and the flange-shaped wall portion 9 are the most remote from the center longitudinal plane A—A of the vehicle and form a hinge, in order to permit the headlight 3 to pivot about the point B upon an impact on the bumper.

For the purposes of mounting the holding element 7, portion 12 of the covering 2 is rotated into the position shown in the broken line in the lefthand portion of FIG. 2. The holding element 8 is connected by way of a pin to the wall portion 10 to provide another pivotable support in the headlight 3.

Assume now that there is an impact on the bumper 1 in the direction C at the center longitudinal plane A—A or at an angle to the center longitudinal plane along the direction D. This impact will cause the covering 2 to be deformed. However, by way of the pivoted connection of the headlight to its wall support members, the headlight 3 will shift to the position shown in the dash/dot lines in FIG. 2 to avoid damage, as the headlight rotates about pivot point B. Upon removable of the load upon the covering 2, the headlight will return to its original position.

Thus, the essential advantage of the present invention is, that in response to an impact of the bumper, even one as high as 8 kilometers/hour, the headlight undergoes a relative movement and rotates to one side to avoid damage. Due to the hinge-like construction of the holding elements and/or the wall portions of the covering, rotation of the headlight is further supported. By arranging a pivotpoint at a support area of the headlight most remote from the center longitudinal line of the vehicle, it can be assured that in response to a head-on impact upon the bumper, an effective pivoting of the headlight to avoid damage to the same will result.

While I have shown and described an embodiment in accordance with the present invention, it is understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

I claim:

1. In a bumper arrangement for a vehicle, particularly a motor vehicle, having a form-stiff support, an elastic covering forming an end portion of the vehicle and a headlight attached to said covering,
    the improvement wherein
    said elastic covering includes wall portions to which said headlight is connected by means of respective holding elements, said holding elements forming hinge-like connections with said wall portions to permit rotational displacement of said headlight, one of said hinge-like connections being provided on the side of said headlight most remote from a center longitudinal plane of said vehicle,
    said wall portions of said covering being flange-like portions of said elastic covering, said flange-like portions being recessed to permit said headlight to be recessed, and
    one of said wall portions being outermost wall portion which is U-shaped in cross-section to permit external access to and protection for the holding element most remote from said center longitudinal plane of said vehicle.

2. In a bumper arrangement for a vehicle, particularly a motor vehicle, having a form-stiff support, an elastic covering forming an end portion of the vehicle and a light attached to said covering,
    the improvement comprising:
    means for pivotally connecting said light to said elastic covering about a vertical axis in a manner that will cause said light to swing inwardly about said vertical axis upon deformation of said covering due to an impact there against.

3. In a bumper according to claim 2, wherein said means for pivotaly connecting said light includes a hinge-like connection at the side of said light most remote from the center longitudinal plane of said vehicle.

4. The improvement according to claim 3, wherein the outermost wall portion of said covering is U-shaped in cross-section to permit external access to and protection for the hinge-like connection most remote from said center longitudinal plane of said vehicle.

* * * * *